United States Patent [19]
Kienle et al.

[11] 3,722,657
[45] Mar. 27, 1973

[54] ROTATIONAL AND TRANSLATIONAL MOTION CONTROLLING METHODS AND APPARATUS FOR CYLINDRICAL ARTICLES AND THE LIKE

[75] Inventors: Raymond P. Kienle, Oak Forest; Gerald R. Bass, Park Forest; James J. Deegan, Clarendon Hills; Johannes Kiwiet, Riverside, all of Ill.

[73] Assignee: Inland Steel Company, Chicago, Ill.

[22] Filed: June 1, 1971

[21] Appl. No.: 148,776

[52] U.S. Cl. ............................................... 198/33 AB
[51] Int. Cl. .............................................. B65g 47/24
[58] Field of Search ........................ 198/33 AB, 161

[56] References Cited

UNITED STATES PATENTS

| | | | |
|---|---|---|---|
| 2,941,654 | 6/1960 | Falconer | 198/161 |
| 2,961,717 | 11/1960 | Morin | 198/161 |
| 2,825,442 | 4/1958 | Carter | 198/33 AB |

*Primary Examiner*—Richard E. Aegerter
*Attorney*—Wolfe, Hubbard, Leydig, Voit & Osann, Ltd.

[57] ABSTRACT

Methods and apparatus for selectively controlling rotational and translational handling and positioning of generally cylindrical objects such as containers for mass production line applications. In the case of handling a container for performing a coating operation or the like thereon, it is subjected to sequential transport and rotational modes. In the case of orientation handling, provision is made for torsionally rolling a container to arrive at a desired angular position, detecting the arrival of the container at the oriented position and longitudinally shifting the container in its fixed oriented position. Any two or more modes may be simultaneously performed with the present methods and apparatus.

8 Claims, 12 Drawing Figures

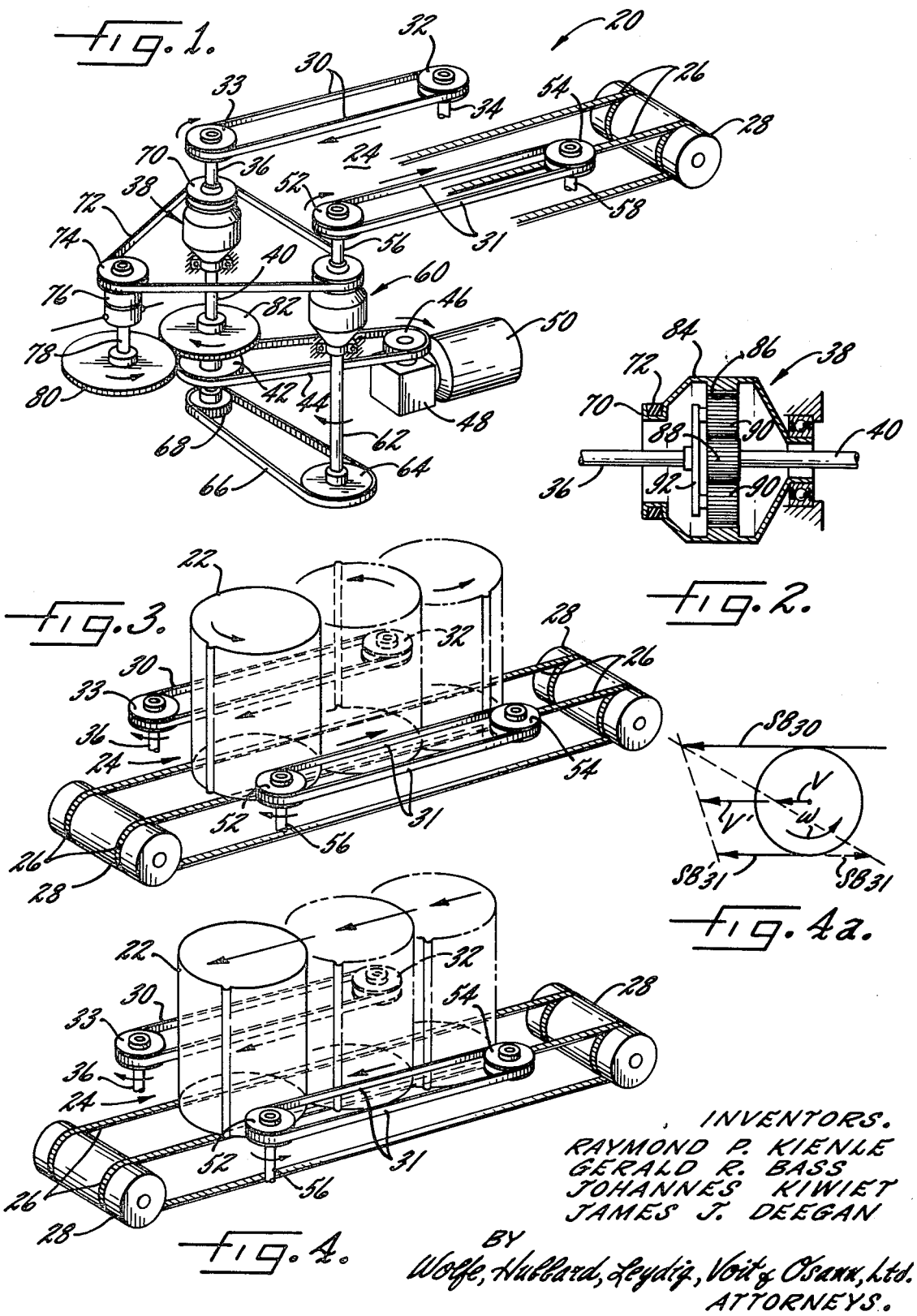

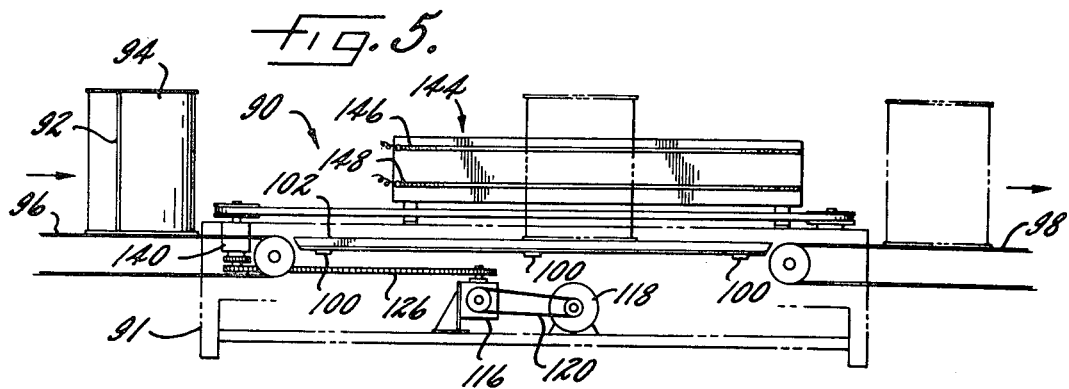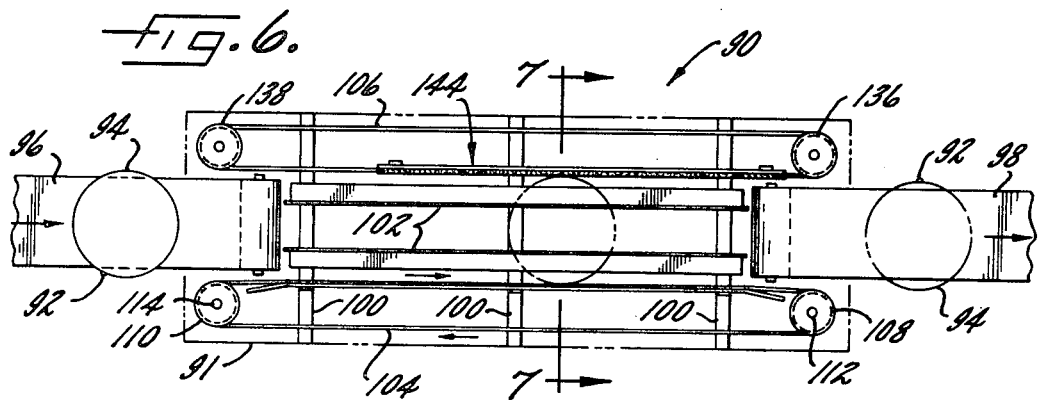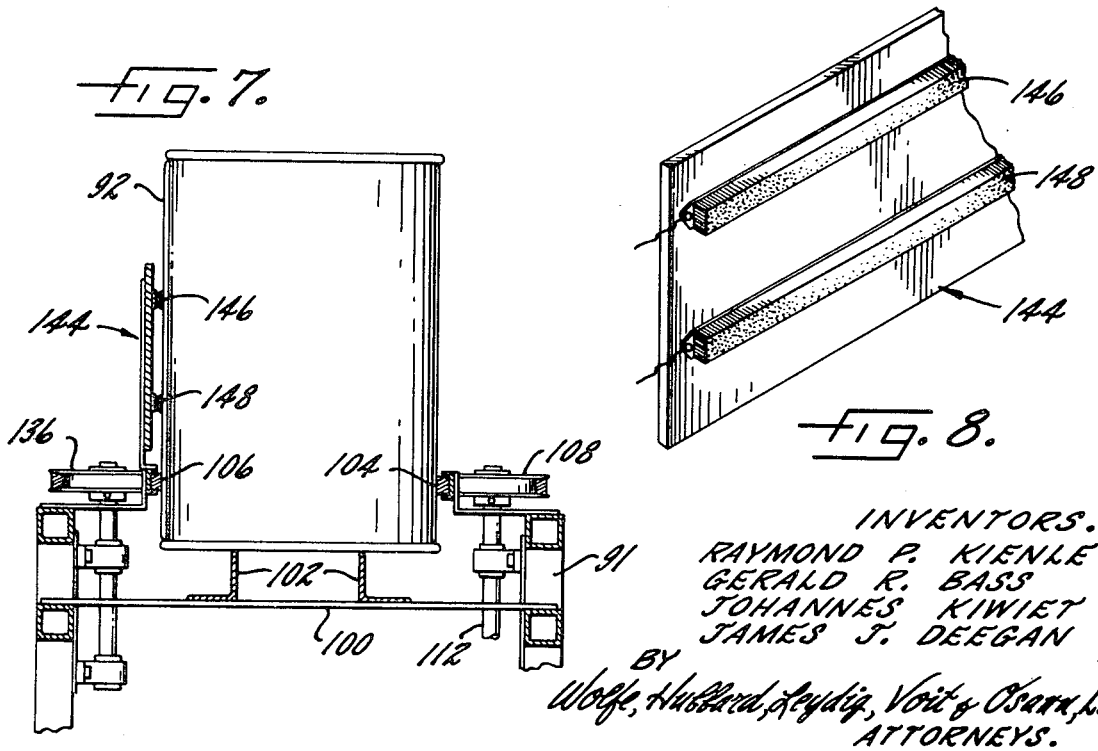

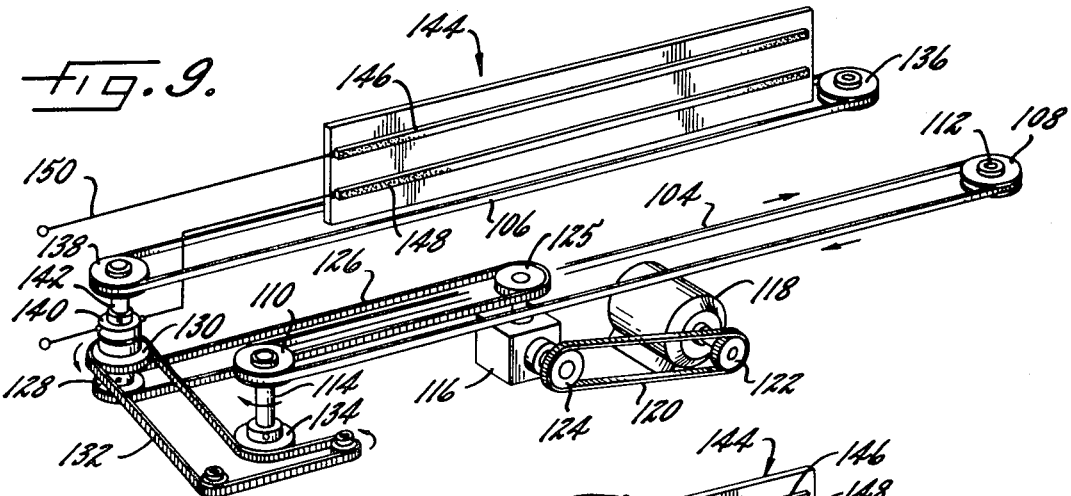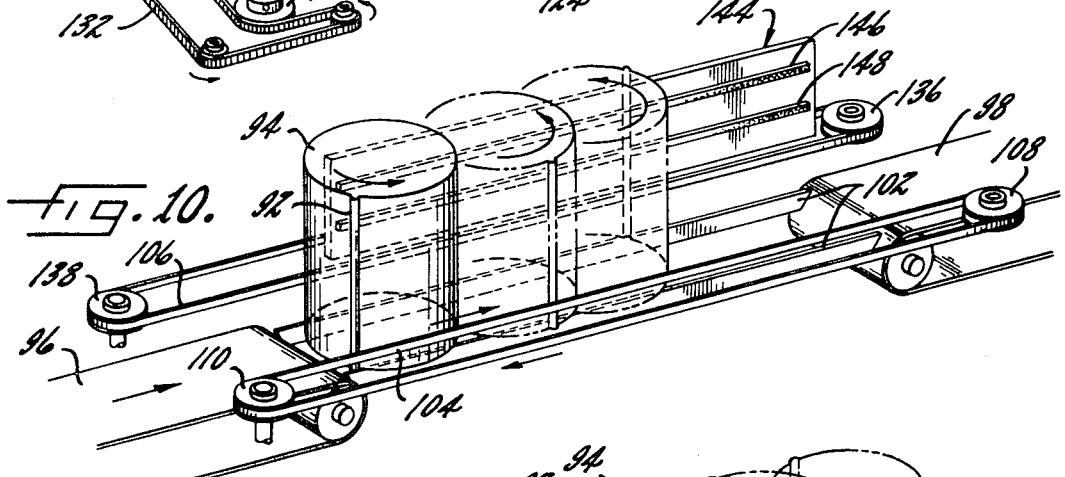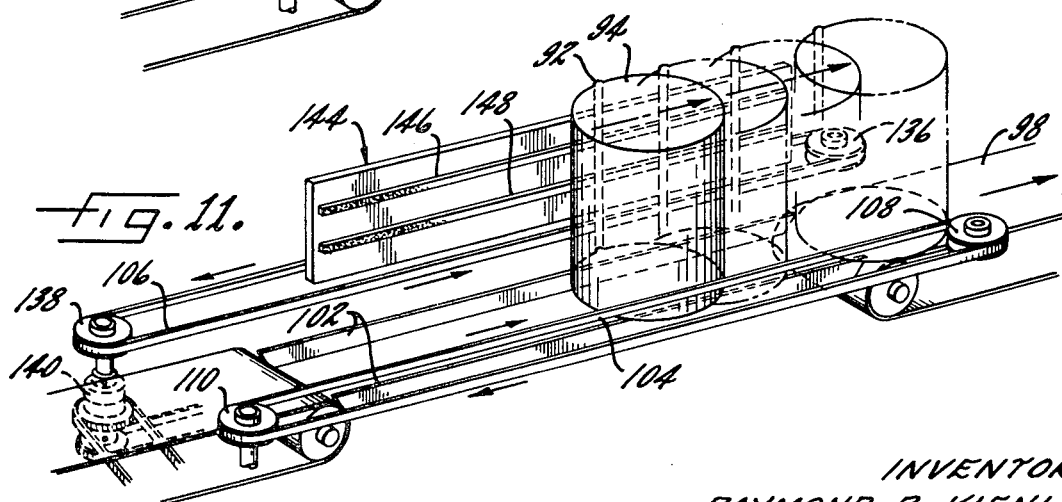

३,७२२,६५७

ROTATIONAL AND TRANSLATIONAL MOTION CONTROLLING METHODS AND APPARATUS FOR CYLINDRICAL ARTICLES AND THE LIKE

BACKGROUND OF THE INVENTION

The present invention relates generally to methods and apparatus for selectively controlling rotation and translation of generally cylindrical articles and the like along a path substantially perpendicular to the axis of the article. More particularly, the invention relates to improved methods and apparatus for handling or precisely orienting with one or more different modes of rotational and translational motion workpieces such, merely by way of example, as cylindrical shells which may comprise side walls of containers or the like.

In various industries, such, for example, as the container manufacturing industry, manufacturing and handling operations are performed where rotation and translation of the cylindrical container side wall in one or more controlled modes is required. The side walls are commonly made of sheet material that is formed into the generally cylindrical shape with the joined edges forming a side seam.

For example, in metal containers the side seam is conventionally formed by welding and in order to properly paint or position components relative to the weld, steps must be taken to properly orient the side seam. This is done before introducing the container to a work station of a production line as well as when repositioning is required for performing subsequent operations at successive work stations.

Another exemplary application in the container manufacturing industry where there is a need for controlling the rotational and translational relationship of a cylindrical article is when coatings are applied to select portions of the container either during or after its production. Typically, coatings applied by spraying operations require translation of the container into and out from the coating station and rotation of the container in the station during performance of the coating operation.

Orientation operations for containers have likewise been performed in the past by clamping a container with rotatable clamp members, rotating the container until the side seam is detected whereupon the rotation is stopped and transferring the oriented container to the desired work station in its then oriented position.

While such arrangements for orienting and performing spray coating operations on containers do provide a satisfactory manner of positioning or handling cylindrical products such as container side walls, nevertheless certain disadvantages have been encountered due to the complexity and amount of apparatus required as well as the high cost of producing the equipment.

Accordingly, it is a general aim of the present invention to provide improved methods and apparatus which overcome the foregoing disadvantages and which are characterized by their ability to control the relationship between rotational and translational handling of substantially cylindrical products rapidly and successively in one or more different modes but on a more economical basis. While not so limited in this application, the invention will find especially advantageous use in the orientation of side seams of cylindrical sheet metal containers and in applying coatings to select portions of such containers.

It is still another object of the present invention to provide methods and apparatus for controlling rotation and translation of container side walls in a production line which are very versatile and permit selection of a wide range of different modes while maintaining predetermined relationships for the specific needs selected.

It is another object of the invention in one of its important aspects to provide an improved apparatus for rotating and translating cylindrical containers and the like which minimizes the time required for orienting or handling in a production line yet which apparatus is extremely simple, reliable and suitable for use in mass production manufacturing operations.

DESCRIPTION OF THE DRAWINGS

Other objects and advantages of the invention will become apparent upon reading the attached detail description and upon reference to the drawings in which:

FIG. 1 is a diagrammatic perspective view of a rotational and translational motion controlling apparatus embodying features of the present invention and for performing the methods of the invention but somewhat simplified for easy understanding;

FIG. 2 is an enlarged cross-sectional view of a planetary type drives utilized with the apparatus of FIG. 1;

FIG. 3 is a diagrammatic view, in perspective, showing one mode of handling a container in accordance with the method of the present invention;

FIG. 4 is a diagrammatic perspective view similar to FIG. 3 but here showing another mode of handling a container in accordance with the method of the present invention;

FIG. 4a is a vector diagram illustrating motions controlled in accordance with the present invention;

FIG. 5 is a general side elevation view of the exemplary orienting apparatus embodying the features of the present invention but somewhat simplified for easy understanding;

FIG. 6 is a top plan view of the exemplary orienting apparatus shown in FIG. 1;

FIG. 7 is an enlarged, cross-section view taken substantially along the line 7—7 in FIG. 6;

FIG. 8 is a fragmentary perspective of the exemplary detector apparatus;

FIG. 9 is a diagrammatic perspective view of the detector and drive mechanism for the orienting apparatus of FIG. 5;

FIG. 10 is a diagrammatic view, in perspective, showing the orienting of a container side seam in accordance with the method of the present invention; and FIG. 11 is a perspective diagrammatic view similar to FIG. 10 but here showing the container in its orienting position being transported out from the orienting apparatus.

While the invention is susceptible of various modifications and alternative forms, specific embodiments thereof have been shown by way of example in the drawings and will herein be described in detail. It should be understood, however, that it is not intended to limit the invention to the particular form disclosed, but, on the contrary, the intention is to cover all modifications, equivalents and alternatives falling with the spirit and scope of the invention.

DESCRIPTION OF THE INVENTION

Turning now to the drawings, there is shown in FIG. 1 an exemplary apparatus, generally indicated at 20, which is particularly suited for selectively controlling the relationship between rotation and translation of generally cylindrical articles moving along a substantially straight line path. While the particular type of article to be translated and rotated in the combination of modes possible with such apparatus is not critical to the present invention, it will be appreciated as the ensuing description proceeds, that the exemplary apparatus 20 shown in FIG. 1 will find particularly advantageous, but by no means exclusive, use in handling a cylindrical container 22 (FIG. 3) which can be made of sheet metal or any other suitable natural or synthetic material.

As best shown in FIG. 1, the exemplary apparatus 20 mounted on a suitable frame (not shown) is adapted to receive generally cylindrical articles with their axis vertical in transfer station 24. The transfer station 24 is composed of longitudinally extending spaced chain belts or the like 26 trained about rotatable drums 38 (FIG. 3) and a pair of spaced endless belts 30, 31 which are mounted horizontally above the runner belts 26. The arrangement is such that containers 22 entering the transfer station at the right are supported on the runner belts 24 adjacent the bottom of the containers and the belts 30, 31 tangentially contact the container side wall on opposite sides thereof.

In carrying out the present invention, provision is made for selectively controlling the relative speed and direction of the belts 30, 31 to control rotation and translation of the article or container trapped therebetween in the one or more different modes available. Chain belts 26 may also be power driven for translating an article therewith. However, as here depicted the belts 26 are not connected to a source of driving power.

Turning first to the belt drive 30 which is trained about pulleys 32,33 that carried by vertically disposed rotatably journaled shafts 34,36, provision is made for driving the belt 30 with predetermined speed and direction. For this purpose, shaft 36 is coupled to the output end of a planetary drive 38 that has its input in turn coupled to a shaft 40 carrying a pulley 42 driven by belt 44. For driving the belt 44, a pulley 46 is provided at the output of a transmission 48 coupled to a driving motor 50.

In order to drive the belt 31 trained about pulleys 52,54 mounted horizontally on their respective shafts 56,58 that are parallel to the shafts 36,34 of belt 30 pulleys, provision is made for driving via motor 50. Thus, the shaft 56 is coupled to the output of a planetary drive 60 similar to planetary drive 38 with the input to planetary drive 60 from shaft 62 carrying a pulley 54 about which belt 66 is trained. Belt 66 is driven by a pulley 68 coupled to shaft 40 which in turn is driven by pulleys 42, belt 44, and pulley 46 of the transmission 48.

In accordance with one of the aspects of the present invention, provision is made for selectively driving the belts 30,31 with predetermined direction and speed so as to control the rotation and translation of a cylindrical article trapped between the belts. To this end, planetary drives 38,60 grooved pulley portions formed in their housings which receive a drive belt 72 trained about the pulley portions 70 of both planetary drives as well as a pulley 74 at the putput end of an electric clutch 76 or the like. A shaft 78 coupled to the input of the clutch 76 carries a gear 80 which meshes with a gear 82 attached to shaft 40 and driven through motor 50 and transmission 48 by belt 44.

For convenience, the description of the planetary drives 38,60 will be made only with reference to drive 38, as best shown in FIG. 2, but it will be understood that both drives are preferably the same. As shown in FIG. 2, the planetary drive 38 includes a housing 84 having an annular row of internal gear teeth 86 within its inside periphery. Input shaft 40 extending into the housing carries a sun gear 88. Planet gears 90 disposed about the sun gear 88 mesh with the latter and the gear teeth 86 of the housing. A planet carrier 92 interconnects the planet gears and is coupled to output shaft 36.

It will be appreciated by those skilled in the art, that rotation of the shaft 40 and sun gear 88, with the housing 84 stationary, causes the planet gears to rotate around the sun gear driving the planet carrier 92 and output shaft 36 in the same direction as the rotational direction of the sun gear but with a speed reduction at the output depending upon the ratio of the particular planetary gear system. Rotation of the planetary drive housings in addition to the rotation of the sun gears varies the speeds and/or directions of the planetary drive outputs.

The output of a planetary drive of the type which has been described can be represented by the following equation:

$$O = H + (I-H)/R \qquad (1)$$

where:
- $O$ = the output shaft rpm;
- $H$ = the housing rpm;
- $I$ = the input shaft rpm; and
- $R$ = the ratio for the housing gear 86 and sun gear 88 input to output.

Where the planetary drives are selected as having a 2:1 ratio, equation 1 may be reduced to the following equation:

$$O = (H+I)/2 \qquad (2)$$

To demonstrate the rotational mode of operation of the apparatus 20, reference is made to FIGS. 1 and 3, conjointly. With the clutch 76 de-energized the housings of planetary drives 38,60 remain stationary and the rotational direction of the output shafts 36,52, as previously noted, will be the same as that of the input shafts 40,62 to the drives. Thus, assuming clockwise rotation of the output pulley 46 from transmission 48, a shaft 40 is driven in the clockwise direction by belt 44 through pulley 42. Belt 30 through pulley 33 and shaft 36 will likewise be driven in the clockwise direction. By the same token, pulley 68 drives belt 66 and pulley 64 connected to shaft 62 in a clockwise direction and belt 31 through pulley 52 connection to shaft 56 moves in this same direction. However, as the belts 30, 31 tangentially contact a container side wall on opposite sides thereof the belt movements are in opposite directions thereby applying torque to the container and rotating the same.

As may be seen by the vector diagram in FIG. 4a, where the speed of belt 30 ($SB_{30}$) is greater than the speed of belt 31 ($SB_{31}$) the container trapped between the belts will roll with angular velocity ω and as long as the belt speeds are not equal and opposite in direction the container will travel at a linear translational velocity V. Thus, the linear translation V of the cylindrical article may be given by the following equation:

$$V = SB_{31} + (SB_{30} - SB_{31})/2 \quad (3)$$

where:
$SB_{31}$ = the speed of belt 31 in feet per minute;
$SB_{30}$ = the speed of belt 30 in feet per minute; and
$SB_{31} \leq SB_{30}$.

The angular velocity ω of the cylindrical article (radians/minute) is established by the equation:

$$\omega = (SB_{30} - SB_{31})/D \quad (4)$$

where:
D = the diameter of the cylindrical article in feet.

It can be seen that the velocity V and angular velocity ω of the cylindrical article can be set at any desired magnitude by proper selection of the belt speeds in accordance with the above equations.

In keeping with the present invention, provision is made for causing belt 30,31 speeds and relative directions to change so that the motion of the cylindrical article trapped therebetween will be programmed to meet the specific modes desired. Referring to FIGS. 1 and 4 conjointly, it will be seen that upon energization of the clutch 76 the output pulley 74 is driven from the input gearing 80,82, and as illustrated the belt 72 is driven in a counterclockwise direction. Accordingly, the housings of planetary drives 38,60 are likewise driven in the counterclockwise direction.

By referring to Equation 2 above, it will be seen that where the planetary drive housing angular velocity in the counterclockwise or negative direction exceeds the input angular velocity in the clockwise or positive direction, the output of the planetary drive will be in the counterclockwise direction. By a proper predetermined selection of the respective speeds of input shafts 40,62 and the rotational velocity of the planetary drive housings, the belts 30,31 will travel in the same direction and at the same speed adjacent the points of tangential contact with the container trapped between the belts and the container will be translated to the left as shown in FIG. 4.

For example, the system may be outlined for a practical case as follows:
motor 50 is selected to operate at 1,800 rpm;
pulleys 46,42 have a ratio of 9:2 so that shaft 40 rotates at 400 rpm in the clockwise direction;
pulleys 68,64 have a 1:2 ratio so that shaft 62 turns at 200 rpm in the clockwise direction;
planetary drives 38,60 with their housings stationary have an input to output ratio of 2:1;
gear drives 80,82 to clutch 76 have a ratio of 4:3 so that with gear 82 turning at 400 rpm in the clockwise direction gear 80 is driven at 300 rpm in the counterclockwise direction; and
pulley 74 and the planetary drive housing pulleys are selected as being of equal diameter so that a 1:1:1 ratio is present.

For example, let it be assumed that there is a requirement for a manufacturing operation that cylindrical container side walls are to be oriented whereby a container is brought into the apparatus, torsionally rolled to arrive at a desired angular position and then longitudinally shifted out from the apparatus in its fixed oriented position. Under this situation taking a container side wall say, for example, having a diameter of one foot and the diameters of pulleys 32,33 and 52,58 being six inches, the following relationships occur:

ORIENT MODE

| Belt No. | Belt Speed (fpm) | Pulley Output (rpm) | Planetary Drive Input (rpm) | Planetary Drive Housing (rpm) |
|---|---|---|---|---|
| 30 | 320 ← * | (pulley 33) 200cw** | 400cw | 0 |
| 31 | 160 → | (pulley 52) 100cw | 200cw | 0 |

*direction as viewed in FIG. 1
** clockwise direction is given by "cw" and counterclockwise direction is given as "ccw"

For the transport mode with the clutch 76 energized, the following parameters are provided:

TRANSPORT MODE

| Belt No. | Belt Speed (fpm) | Planetary Drive Output (rpm) | Planetary Drive Input (rpm) | Planetary Drive Housing (rpm) |
|---|---|---|---|---|
| 30 | 90 ← | 50cw | 400cw | 300cw |
| 31 | 80 ← | 50cw | 200cw | 300cw |

Applying the foregoing parameters to Equations 3 and 4 above, it will be noted that in the orient mode the linear translation velocity V is 80 fpm from right to left as viewed in FIG. 1 while the angular velocity is 470 radians/minute. In the transport mode the translational velocity is 80 fpm and the angular velocity is 0. This arrangement causes the container side wall to transfer laterally at a constant low speed irrespective of the mode allows orientation to occur in a relatively short time due to the high angular velocity during orientation.

The clutch 76 may be energized by any suitable detection or sensing arrangement that is well known to those skilled in the art so that change over to one or more can be programmed into the apparatus. Even greater versatility can be obtained through the use of a variable slip clutch or drive in place of clutch 76 whereby the belts 30,31 may be driven at any number of selected speeds and in the same or opposite directions to control the rotation and translation of the cylindrical article trapped between the belts.

Turning now to FIG. 5 there is shown another exemplary apparatus generally indicated at 90 which is particularly suited for positioning side seams of container side walls in accordance with the present invention. Here, the apparatus is shown as used in positioning side seam 92 of container 94 which can be made of sheet metal or any other suitable natural synthetic material. Cylindrical containers are fed to the apparatus 90 in seriatim order by means of a conveyor belt 96 or the like.

The particular means for driving the conveyor belt 96 are not critical to the present invention and may take any of the wide variety of conventional forms well known to those skilled in the art. It should suffice to say that the drive system for the conveyor belt is such that control means are provided for automatically moving the belt to transfer containers from work station to work station. The transfer may be either by intermittently stopping the belt as successive containers reach the orienting apparatus so as to permit performance of the orienting cycle. On the other hand, by continuously running the belt 96 with the containers spaced thereon so that successive ones thereof are brought to the orienting apparatus as the preceding container moves out from the apparatus the same result may be achieved. Transference of the containers after orientation or performance of a operation such as a spray coating on the container is by means of a conveyor belt 98 similar to the conveyor belt 96.

The exemplary apparatus 90 as shown in FIG. 5 is positioned between the conveyors 96,98 and is made up of a generally rectangular frame structure 91 (shown in phantom). Transversely bridging the top of the frame are cross members 100 which support longitudinally extending runners 102. The runners 102, of course, may be substituted with chain belts 26 trained about rollers 28 as shown in connection with the FIG. 1 configuration.

Containers 94 enter the apparatus at the left from conveyor 96 and, as will be described, each container successively is moved along the rails or runners 102 whereby rotation and translation takes place in accordance with the present invention and thereafter the container emerges onto the conveyor 98 where it is transferred for further handling, shipment or storage.

In carrying out the present aspects of the invention, provision is made for torsionally rotating the container to a predetermined position of orientation as determined by a side seam or the like of the container and then longitudinally shifting the oriented container along the runners 102 to the output conveyor 98. In order to understand the mechanism for accomplishing this two-fold process, reference is made to FIGS. 6, 7 and 8. To this end, there is provided a pair of spaced apart endless belt drives 104, 106 which are mounted horizontally upon the frame structure 91. The arrangement is such that the belts tangentially contact a container side wall on opposite sides thereof when the container is brought onto the runners 102 (FIG. 7).

Attention will first be given to the belt drive 104 which is trained about the pulleys 108, 110 that are carried by vertically disposed shafts 112,114, respectively, rotatably journaled to the frame 91. Belt 104 is continuously driven during operation of the orienting apparatus by means of a belt drive arrangement coupled through a transmission 116 that is in turn coupled to a driving motor 118 (FIGS 5 and 9). The motor 118 and transmission 116 are carried on the frame 91 positioned below the orienting station runners 102. For driving the transmission 116 a belt 120 is in turn trained about motor pulley 122 and transmission pulley 124.

It will be apparent that the transmission output pulley 125 (FIG. 9) drives the belt drive 104 via belt 125, pulleys 128,130, belt 132 and pulley 134 attached to shaft 114. To drive the belt 106 trained about pulleys 136,138, there is provided an electric clutch or the like 140 having its output coupled through shaft 142 to pulley 138 secured thereto.

Since the belt drive 106 is driven through the clutch 140, which can disengage so that the belt 106 is stationary, a container entering the orienting station is engaged on one side by the continuous running belt 104 which presses the opposite side of the container side wall against the stationary belt 106 causing the container to be torsionally rolled along the belt 106.

In accordance with one of the features of the present invention, means are provided to detect the arrival of a container seam 92 at a predetermined desired position and to activate the clutch 140 when this occurs. To this end, detector means, generally indicated at 144, are provided in the form of an electrical continuity circuit having electrodes 146,148 which are biased against the side wall of the container and which are electrically connected when engaged by the side seam 92 of the container. With the present exemplary form of detector, it will be appreciated that the container side wall in the vicinity contacted by the detector electrodes 146,148 has a non-conducting coating thereon about the periphery of the side wall with the exception of the side seam area. The non-conducting coating, of course, may be the ordinary protective or decorative coating or a special coating applied specifically for the purpose of utilizing the present detector arrangement. Thus, during the torsional rolling of the container, the detector electrodes are not interconnected due to the presence of the non-conductive coating until such time as the side seam area is brought into contact with the electrodes and bridging the same to complete the circuit therebetween. The electrodes (FIGS. 7, 8 and 9) may be of any suitable conducting material, but in the preferred form of the invention, the electrodes are made of soft copper bristles to insure maximum contact and minimize the possibility of scraping or marking the container coating.

When the container side seam rolls into the position where it contacts the electrodes to bridge the same, the electrical circuit 150 (FIG. 9) to the clutch 140 is completed and belt drive 106 is driven with the same speed and direction as continuous running belt 104 thereby discontinuing the torsional rolling of the container and causing it to move longitudinally along the runners 102 with its orientation fixed In order to more fully understand the mode of operation of the exemplary orienting apparatus 90, reference is now made to FIG. 5 wherein the apparatus is shown in the "start" position with a first container 94 having a non-oriented side seam 92 being moved by conveyor 96 into the orienting or transfer station of the apparatus. Referring now to FIG. 10 it will be seen that upon entering the orienting station, the continuous running belt 104 causes the container to roll along belt 106 so that the side seam 92 moves in the counterclockwise direction as shown in FIG. 10 until the side seam is brought around to where it contacts the detector electrodes 146,148. Once contact is made between the electrodes and the side seam 92 as shown in FIG. 11 the clutch driven belt 106 is engaged and the container stops rolling and moves longitudinally along the runners 102 with the side seam in a fixed position relative to the detector whereupon the oriented container is placed onto the output conveyor 98.

While orientation of a container side seam has been described in connection with the foregoing embodiment of the apparatus, it will be understood that other arrangements may be employed for carrying out the method in accordance with the present invention. Thus, other detection means not dependent on the use of a non-conductive coating and continuity circuit detector will be appreciated by those skilled in the art. For instance, detection of the desired oriented position may be obtained by use of a suitable fluorescent mark that can be picked up by a detection strip. Also, where marking of the container pre-painting or pre-lithographing might be a problem, the detector assembly itself can be arranged to retract when the position signal has been transmitted to energize the clutch so that no rubbing will occur between the container and detector during longitudinal translation of the container. Prior to the energization of the clutch that eliminates relative motion between the belts 104,106 the container undergoes pure rolling motion and no rubbing occurs.

It will be apparent from what has already been said with respect to the embodiment of FIG. 1 that in accordance with the present method the linear velocity of translation of the container side wall may be determined by use of Equation 3 which is given for the embodiment of FIG. 5 as follows:

$$V = SB_{106} + (SB_{104} - SB_{106})/2$$

Similarly, the angular velocity of the cylindrical article (radians/minute) may likewise be expressed as in equation 4 as follows:

$$\omega = (SB_{104} - SB_{106})/D$$

An example of a practical set-up for orientation application with the apparatus of FIG. 9 as determined by the foregoing equations may be summarized as follows:

|  | Belt Speed $SB_{106}$ (fpm) | Belt Speed $SB_{104}$ (fpm) | V (fpm) | ω(radians /minute) |
|---|---|---|---|---|
| Orient Mode | 0 | 360 → | 180 → | 360ccw |
| Transport Mode | 360 → | 360 → | 360 → | 0 |

With this arrangement the container upon entering the apparatus when rotated at 360 radians per minute while translating at a rate of 180 feet per minute until angular orientation occurs and then is transferred laterally in a fixed angular position at a rate of 360 feet per minute. It is noteworthy that the orientation process occurs within a relatively short period of time, and it is one of the features of the present apparatus inspite of the sequential action, because the apparatus requires that only one container be between the belts at a given time, substantially high production rates are still obtainable. However, if it is desirable to further increase the capacity, that is, the number of containers oriented per unit of time yet without extreme speeds being applied to the apparatus components, a number of units may be mounted in series with only a portion of the necessary orientation revolutions occuring in each unit.

Moreover, if it is desirable to foreshorten the overall length of a orientation station or to utilize the apparatus for spray coating operations and the like, the clutch driven belt 106 may be provided with a reversible drive so that after the container enters the station the clutch driven belt moves in a direction opposite to the continuously running belt 104. With such an arrangement the container virtually remains stationary while rotating until orientation or the work operation occurs. Upon generation of a detector or similar sensing signal, the reversible clutch may then run forward and the container would move longitudinally in the proper fixed position.

An example of a practical set-up for spray coating operations with the apparatus of the present invention may be summarized as follows:

|  | Belt Speed $(SB_1)$ (fpm) | Belt Speed $(SB_2)$ (fpm) | V (fpm) | ω(radians /minute) |
|---|---|---|---|---|
| Transport Mode | 0 | 200 → | 100 → | 200ccw |
| Rotational Mode | 200 ← | 200 → | 0 | 400 ccw |

Here the container is transported by rolling with a translational speed of 100 feet per minute and angular velocity of 200 radians/minute until the container reaches the spray coating area in the transfer station of the apparatus. At this point the stationary belt ($SB_1$) is started up and driven at the same speed as the other belt ($SB_2$) but in the opposite direction so that the container simply rotates in place at an angular velocity of 400 radians/minute. After completion of spray operations, the system control would be switched back to the transport mode to shift the container out and bring in a next container for coating.

It will also be understood that in orienting with the apparatus of FIG. 5 the container side seam may be positioned in any desired predetermined orientation relative to a fixed reference and such position need not necessarily be along the detector. To this end, incorporation of a time delay in the detector circuit permits continued rolling of the container to a desired position of orientation before the clutch is energized to discontinue the rolling and starting of the fixed position shifting of the container out from the orienting station.

We claim as our invention:

1. Apparatus for controlling rotational and translational motions of generally cylindrical articles and the like along a path substantially perpendicular to the axis of the article comprising, in combination, runner means adapted to receive the articles one at a time in a transfer station, means for engaging one side of an article with a first movable surface, means for engaging the opposite side of said article with a second movable surface, means for individually and selectively controlling the respective speed and direction of each of said movable surfaces so that said article trapped between the surfaces is moved in predetermined translational and rotational modes in said transfer station and means changing said control means so that at least two modes are used during transport of the article through the transport station.

2. Apparatus as claimed in claim 1 wherein the linear speed of the translation mode of the article is given by the expression:

$$V = S_1 + (S_2 - S_1)/2$$

where:

$S_1$ is the linear speed of said first surface, $S_2$ is the linear speed of the second surface, and $S_1 \leq S_2$ and the angular velocity of the rotation mode of the article is given by the expression:

$$\omega = (S_2-S_1)/D$$

where:
D is the diameter of the article.

3. Apparatus as claimed in claim 2 wherein said means for changing the relative speeds and directions of said movable surfaces reverses at least one of said surfaces when said article is in the transfer station.

4. Apparatus for controlling rotation and translation of cylindrical shells and the like comprising, in combination,
- frame means adapted to receive the shells one at a time in a transfer station,
- first belt means mounted on said frame and disposed along one side of said transfer station,
- power means for driving said first belt means,
- second belt means disposed on the opposite side of said transfer station with the space defined between said first and second belt means being such that opposite sides of a shell in said transfer station are engaged by both of said belt means,
- drive means coupling said second belt means to said power means, and
- changeover means disposed in said second belt drive coupling for selectively driving said first and second belt means at the same speeds and in the same directions and at different relative speeds and directions.

5. Apparatus as claimed in claim 4 wherein said changeover selective drive means includes a pair of planetary gear drives with their respective outputs coupled to said first and second belt means, each of said planetary drives having a rotatable housing, an internal housing gear meshing with planetary gears, said planetary gears meshing with a sun gear coupled to an input driven by said power means, and means including a clutch for alternatively maintaining said planetary drive housing stationary and rotating said housings to vary the rotational speed and direction of the planetary drive outputs connected to said first and second belt means.

6. Apparatus for orienting cylindrical shells and the like comprising, in combination,
- frame means adapted to receive the shells one at a time in an orienting station,
- first belt means mounted on said frame and disposed along one side of said orienting station,
- power means for continuously driving said first belt means,
- second belt means disposed on the opposite side of said orienting station and the space defined between said first and second belt means being such that opposite sides of a shell in said orienting station are engaged by both of said belt means,
- drive means including clutch means coupling said second belt means to said power means driving the first belt means,
- detecting means for determining the arrival of a shell at position relative to a fixed reference,
- means responsive to the detected arrival of said shell at said predetermined position for energizing said clutch means so that said second belt means is driven at the same speed and direction as said first means to longitudinally move the oriented shell along said frame means and out of said orienting station.

7. The method of orienting cylindrical articles and the like comprising the steps of
   a. transporting said articles one at a time to transfer station,
   b. engaging opposite sides of the articles in the station with movable surfaces,
   c. driving said surfaces at predetermined relative speeds and directions to impart torsional rolling of the article in said station,
   d. detecting a predetermined position of said article to a fixed reference adjacent one side of the article,
   e. changing the relative speeds and directions of at least one of said movable surfaces to the same speed and direction as the other movable surface upon the article reaching the predetermined position, and
   f. longitudinally shifting said article out of the transfer station in its fixed oriented position.

8. The method of controlling rotation and translation of cylindrical articles and the like along a path generally perpendicular to the axis of said articles comprising the steps of
   a. transporting said articles one at a time to a transfer station,
   b. engaging opposite sides of the article in the transfer station with movable surfaces.
   c. driving said surfaces with first relative predetermined speeds and directions to controllably move the article in said transfer station in a first selected mode of rotation and translation,
   d. changing the drive of said surfaces to second relative predetermined speeds and directions to move the article in said transfer station in a second selected mode of rotation and translation, and
   e. longitudinally shifting said article out of the transfer station.

* * * * *